United States Patent [19]

Henry et al.

[11] 4,058,872

[45] Nov. 22, 1977

[54] SHEEP AND LAMB MECHANICAL TOE-BREAKER

[75] Inventors: J. R. Henry; Willis E. Teague, both of San Angelo, Tex.

[73] Assignee: Armour and Company, Phoenix, Ariz.

[21] Appl. No.: 683,607

[22] Filed: May 4, 1976

[51] Int. Cl.² .............................................. A22B 5/00
[52] U.S. Cl. ........................................ 17/1 R; 17/44; 74/89.21
[58] Field of Search ...................... 17/1 R, 16, 1 B, 44, 17/44.3; 74/89.21

[56] References Cited

U.S. PATENT DOCUMENTS

| | | | |
|---|---|---|---|
| 2,366,666 | 1/1945 | Chapman | 17/1 R |
| 3,165,780 | 1/1965 | Kellersman et al. | 17/1 R X |
| 3,230,577 | 1/1966 | Hughes | 17/1 R |
| 3,882,570 | 5/1975 | Zwiep et al. | 17/1 R |

Primary Examiner—David H. Brown
Attorney, Agent, or Firm—Frank T. Barber; Charles E. Cates

[57] ABSTRACT

A machine for breaking the foretoes of sheep and lambs carried on a moving kill chain. It has a fork presenting seriatim the open end of the tines to receive the forefeet of sheep at the knuckles, a portion of the tines spaced to closely confine and engage the knuckles and a more widely spaced portion of the tines to release the feet as the sheep is advanced by the killing chain. The machine provides means for supporting and rotating the tines of the fork around its longitudinal axis to break the toes while the sheep's feet are engaged. When the toes are broken, the fork rotates back to the original position.

6 Claims, 6 Drawing Figures

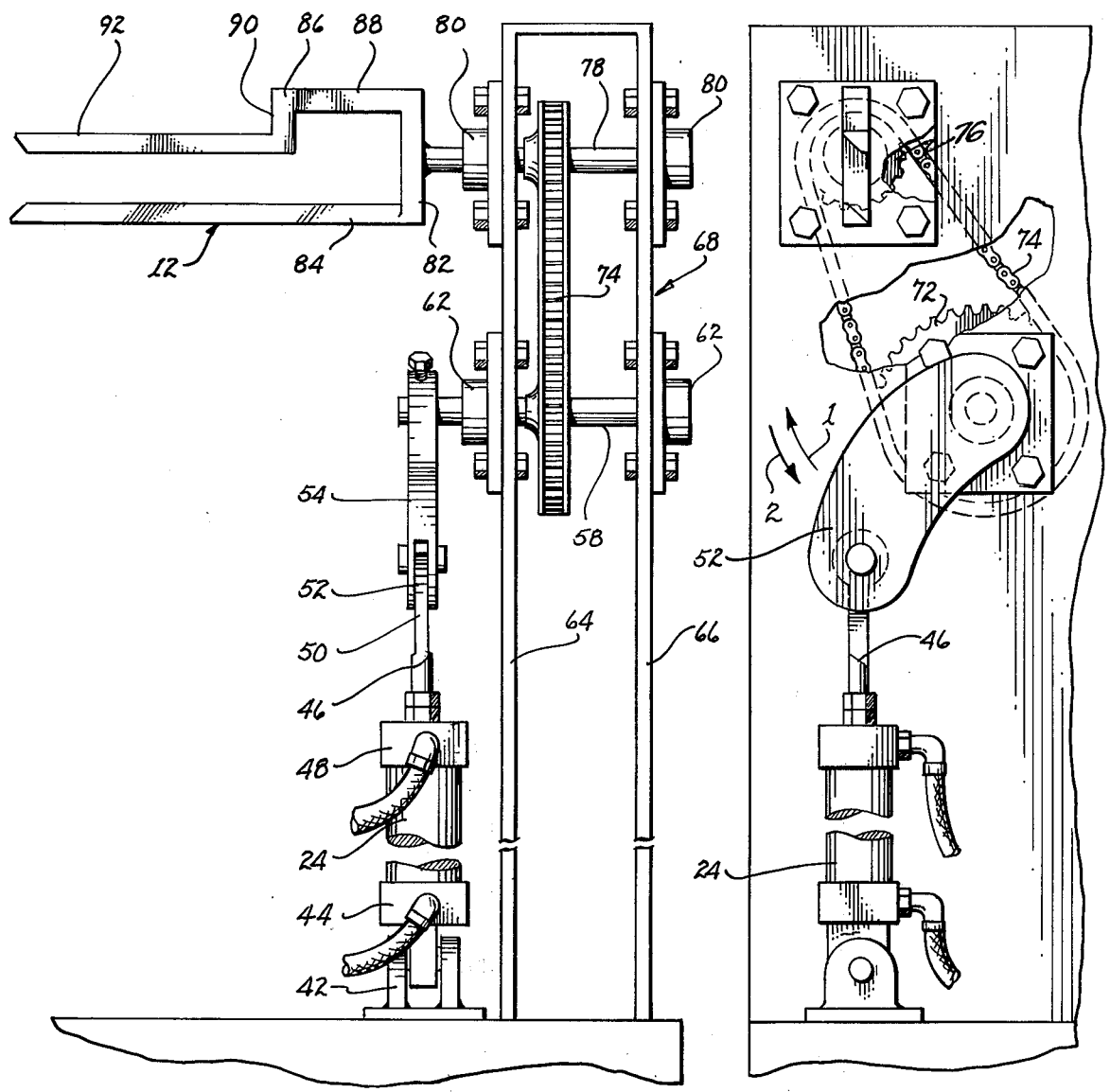
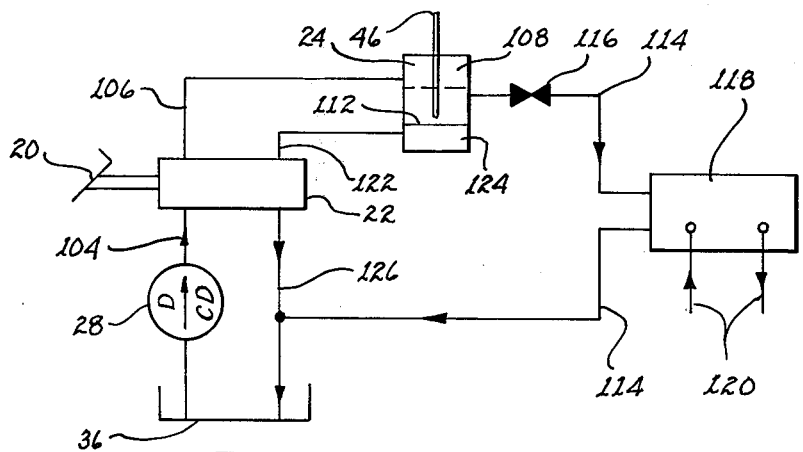

SHEEP AND LAMB MECHANICAL TOE-BREAKER

BACKGROUND

This invention relates to the art of sheep slaughtering and to machinery to be used on the sheep-killing chain. More specifically, the invention is a machine for breaking the foretoes of sheep carcasses.

Possibly the least sought after job in a sheep slaughter house is the toe breaker's job. It is a tedious job which requires strength and endurance; it can be handled only by husky men.

In the slaughtering process the sheep are suspended from the killing chain by hooks inserted between the bones and tendons of the hind feet and are conveyed with the forefeet hanging down. The toe breaker stands on the side of the chain which will present the bellies of the sheep to his view. As each carcass comes into reach, he grasps its two forefeet, one in each hand in a milking grip, and breaks the toes at the knuckles by simultaneously raising the toes and turning his hands over and inwardly towards his own body.

A man must be broken in slowly on the job. On the average it requires a full 3 weeks to get a new man accustomed to toe breaking and physically conditioned to handle the job unassisted. During the "break in" period, another man must assist the apprentice toe-breaker and relieve him periodically. It sometimes happens that a new man will be on the job only a few hours before a weakness in his wrists will cause him to stop. In many cases medical treatment is required.

Because it is generally considered the least desirable job in the plant, and because union rules provide that the newest man gets the least desirable job, the toe-breaker's job is filled only until a new man acquires enough seniority to advance to a different job. Due to the usual high turnover of personnel in a slaughter house, this may be a matter of a few weeks or less.

It is recognized that at best the job is tedious in addition to being physically wearing. Nonetheless it is a necessary job. The sheep's toes must be removed and the most efficient way to remove them is to first break them at the knuckles. When the toes are broken, a splinter of bone sticks out through the pelt, marking the joint where the toes should be severed from the rest of the leg. This serves two purposes—it makes the toes easier to sever and it also indicates the position of the joint so that no false moves are made in severing the toes.

For the purposes of relieving fatigue and injury to the workmen, upgrading the job, and reducing the manpower and hours required to be devoted to this operation, especially in breaking in, it would be desirable to have a machine capable of doing the onerous part of the toe-breaker's job. As will hereafter be pointed out, applicant's invention meets this need.

BRIEF SUMMARY OF THE INVENTION

The apparatus of the toe-breaker has a pair of cooperating guide members which are means for receiving, temporarily confining or engaging, and subsequently releasing the toes of sheep carcasses as they are presented to the machine. It also has means for operatively supporting and rotating the cooperating guide members sufficiently to break the toes of the sheep carcasses during the time the toes are engaged or confined by the guide members. Having broken the toes of a sheep carcass, the cooperating guide members rotate back to the original position and the carcasses are carried onward by the killing chain and released from the machine. Thereafter a following carcass is carried by the chain to operative proximity with the mechanical toe-breaker. The operator repeats the process by guiding the toes of the sheep into the open end of the guide members for temporary engagement and actuating the means for rotating the guide members. After the sheep's toes are broken, the guide members automatically counter-rotate to starting position, and the toes move out of the grasp of the device as before described.

The construction and operation of the various elements of the device can be better understood from a consideration of the drawings in which.

Figure 2:
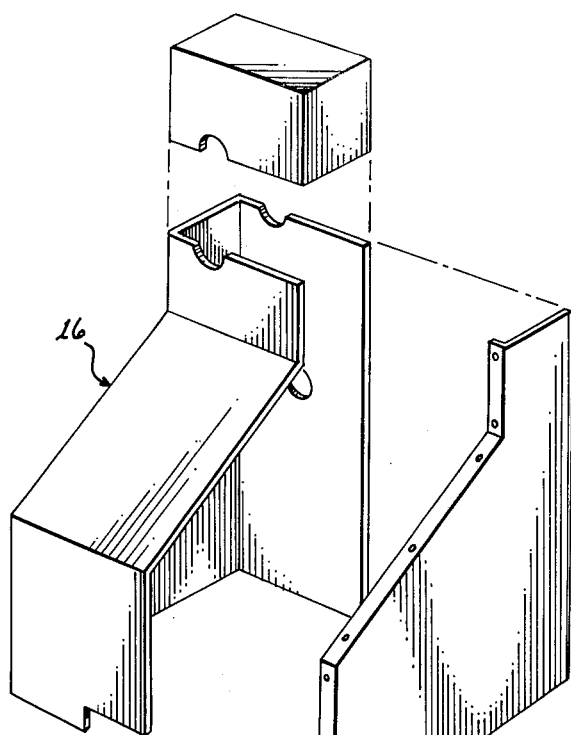
FIG. 2 is a perspective view of the machine with its protective cover shown in exploded view.
Figure 2:
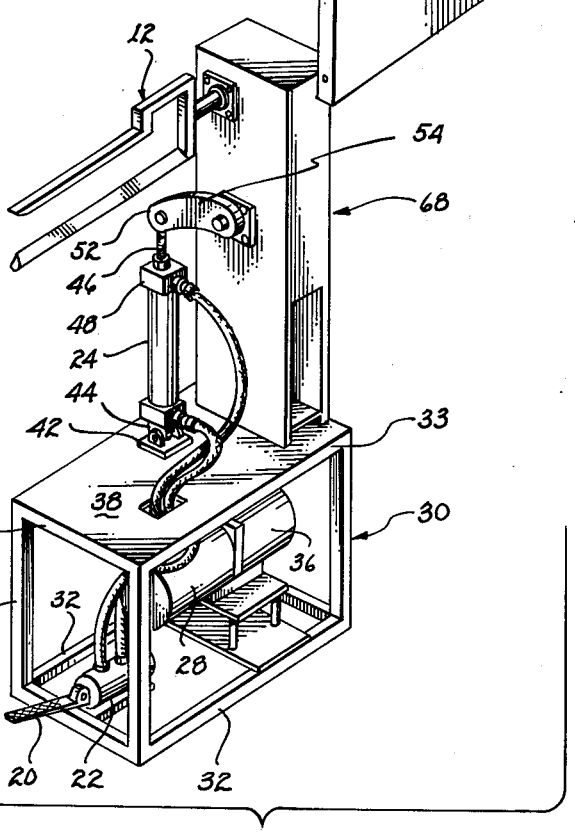
Figure 3:
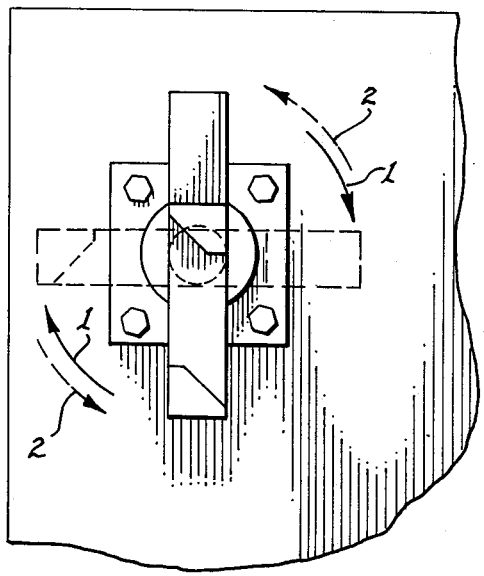
FIG. 3 is an enlarged end view of the fork portion of the device of FIG. 1.

FIG. 4. is a side elevation view of an enlarged portion of the device of FIG. 2 with the side panels of the device removed;

FIG. 5 is a front elevation view of an enlarged portion of the device of FIG. 2 with a portion of the front panel cut away;

FIG. 6 is a schematic representation of the hydraulic system which operates the device.

DETAILED DESCRIPTION OF THE PREFERRED EMBODIMENT

Figure 1:
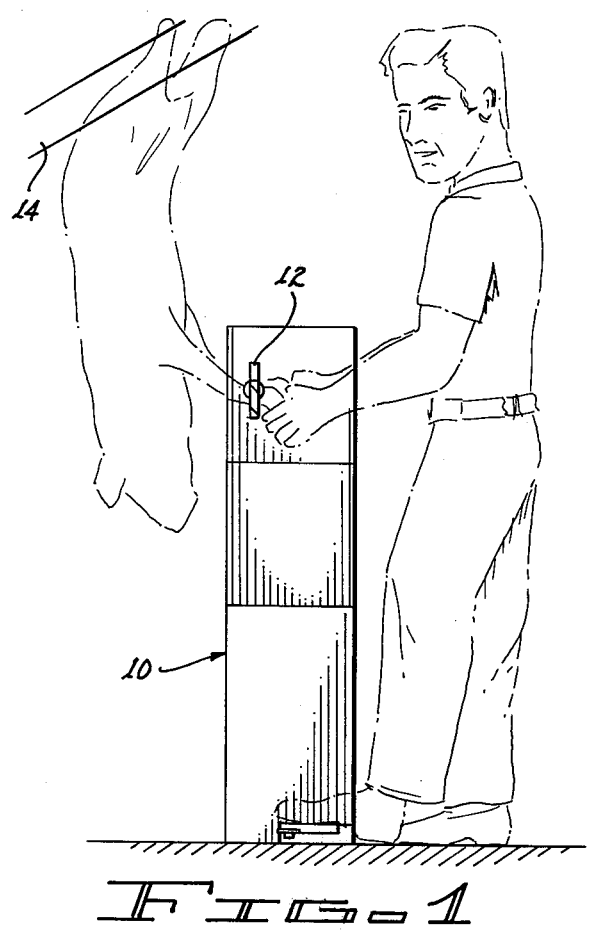
FIG. 1 is a view of the machine with an operator (in phantom outline) in attendance, showing the relationship to the killing chain and sheep (in phantom outline) to be processed.

Referring to the drawings wherein the machanical toe-breaker is generally referred to by the numeral 10, FIG. 1 shows a workman in the process of guiding the forefeet of a sheep into the open end of the fork 12. The animal is being conveyed by means of a kill-chain 14 to proximity with the toe-breaker 10 for processing.

In FIG. 2 the components of the machine will be seen in greater detail. The working arts of the machine are covered by a protective housing 16 (not a part of this invention), which serves a safety function and makes the machine more attractive and easier to clean.

The operative parts of the toe-breaker include the fork 12 actuated through intermediate linkage by hydraulic cylinder 24 in response to pressure on the foot pedal 20 of bi-directional control valve 22. A box frame 30 (see FIG. 2) supports the structure. Its horizontal members 32, 33 and vertical members 34 are made of angle iron, but tubular iron or any other suitable construction metal may be used. They are joined by welding, but other convenient means are known to the trade. Fastened to horizontal members 32 are the hydraulic pump 28 and reservoir 36.

Horizontal members 33 support a shelf 38 which is welded on. Similarly a clevis 42 is welded to the upper surface of the shelf 38. The double-acting hydraulic cylinder 24 is fastened at its first end 44 to the clevis. The cylinder 24 is conventional in design and has a rod 46. The end 50 of the rod 46 pivotally engages the claw 52 of the arm 54 which is the first element of the linkage hereafter described. It will be noted that the pivotal engagement of the end of the cylinder in the clevis and the end of the rod 46 in the claw 52 permit the cylinder to oscillate in accommodation to the movements of the arm 54 and rod 46. The arm engages the end of the shaft 58 (see FIG. 4) journaled in bearings 62 mounted on the front 64 and back 66 panels of the gear box 68. Shaft 78 is journaled in bearing 80 mounted on front and back panels 64, 66 of the gear box.

As best seen in FIGS. 4 and 5, tow sprockets, 72, 76 are mounted for rotation on shafts 58, 78. Entrained over the sprockets is a roller chain 74. The one end of shaft 78 is fastened to the base 82 of fork 12. Thus the reciprocal movement of the rod 46 is translated to rotary movement in the fork 12. The fork has two tines which in this preferred embodiment comprise a first tine 84 which extends at an angle of 90° from the one end of the base 82, and a second tine 88 having a first leg 86 extending at an angle of 90° from the other end of base 82, a second leg 90 which runs parallel to base 82, and a third leg 92 parallel to the first tine 84. The tine 84 and the third leg 92 are spaced 1¼ inches apart in this preferred embodiment, which is sufficient to receive all but the largest sheep, and which has proved to be a workable distance in practice. Nevertheless, when an unusually large sheep appears on the line, its toes must be broken by hand.

The operation of the toe-breaker can be further illustrated with reference to FIG. 6 wherein the schematic is depicted. A constant delivery pump 28 draws fluid from a reservoir 36 and pumps the fluid through conduit 104 into Vickers foot valve 22. When pedal 20 is at rest, conduit 104 is connected to outlet conduit 106, communicating with the rod side 108 of hydraulic cylinder 24. When rod side 108 is under pressure, piston 112 is retracted as shown in FIGS. 4 and 5. From the rod side 108 the fluid enters return line 114, passing through pressure relief valve 116, thence into oil cooler 118, out through return line 114, and back to reservoir 36 to complete the cycle. When pedal 20 is depressed, the flow from conduit 104 is diverted to conduit 122 and thence into blank side 124 of piston 112. The pressure of the fluid in the blank side 124 causes the rod 46 to advance; simultaneously line 106 and 126 are connected through valve 20 to release the pressure on the rod side 108.

After the initial impulse, the valve 20 reverses itself and communication between conduits 104, 106 is resumed and pressure is again exerted on the rod side of the piston 112. Conduit 122 communicates with return line 126, releasing the pressure in blank side 124 of piston 112.

During the stroke of the advancing rod 46, the fork 12 rotates 270° clockwise (viewed from the open end of the tines) and returns to start when the rod withdraws. The stroke and degree of rotation maybe adjusted to suit, the foregoing being presently preferred.

Cooler 118 exchanges heat between the fluid in return line 114 and cooler fluid conveyed through lines 120. The prolonged operation of the device heats the oil used in the system and an oil cooler has been found beneficial.

In a cycle of operation, the kill advances the carcass from left to right (per FIG. 4) toward the toe-breaker 10 approaching the open end of the fork 12. The operator guides the toes into the slot between the tine 84 and leg 92. While the toes are thus closely confined the operator causes the fork to rotate by pressing pedal 20. The force of rotation breaks the toes and the line carries the carcass out through the enlarged space defined by leg 86 and tine 84 thence away to the next station. Concurrently another carcass is being advanced to the toe-breaker.

Modifications and equivalents will be apparent from the teachings of the invention to persons skilled in the art. All such are intended to be encompassed within the invention as defined by the appended claims.

What is claimed is:

1. An apparatus for mechanically breaking the toes of sheep carcasses as said carcasses are presented by a killing chain comprising: a frame, a pair of cooperating guide members carried by said frame having means defining a slot for temporarily engaging and subsequently releasing said toes, and means carried by said frame and operatively connected to said guide members for rotating said guide members while the toes are temporarily engaged.

2. The apparatus of claim 1 wherein said cooperating guide members rotate through 270° and return.

3. The apparatus of claim 1 wherein said means for rotating said cooperating guide members comprises a fluid operated piston and means responsive to said piston for converting the linear motion of said piston to rotary motion in said cooperating guide members.

4. The apparatus of claim 1 wherein said pair of members form an open end and join together in a fork, and are provided with a more widely spaced section near the fork to release the toes of the sheep carcass.

5. The apparatus of claim 1 wherein said guide members are parallel.

6. The apparation of claim 1 wherein said guide members are parallel to the killing chain.

* * * * *